Patented Nov. 12, 1935

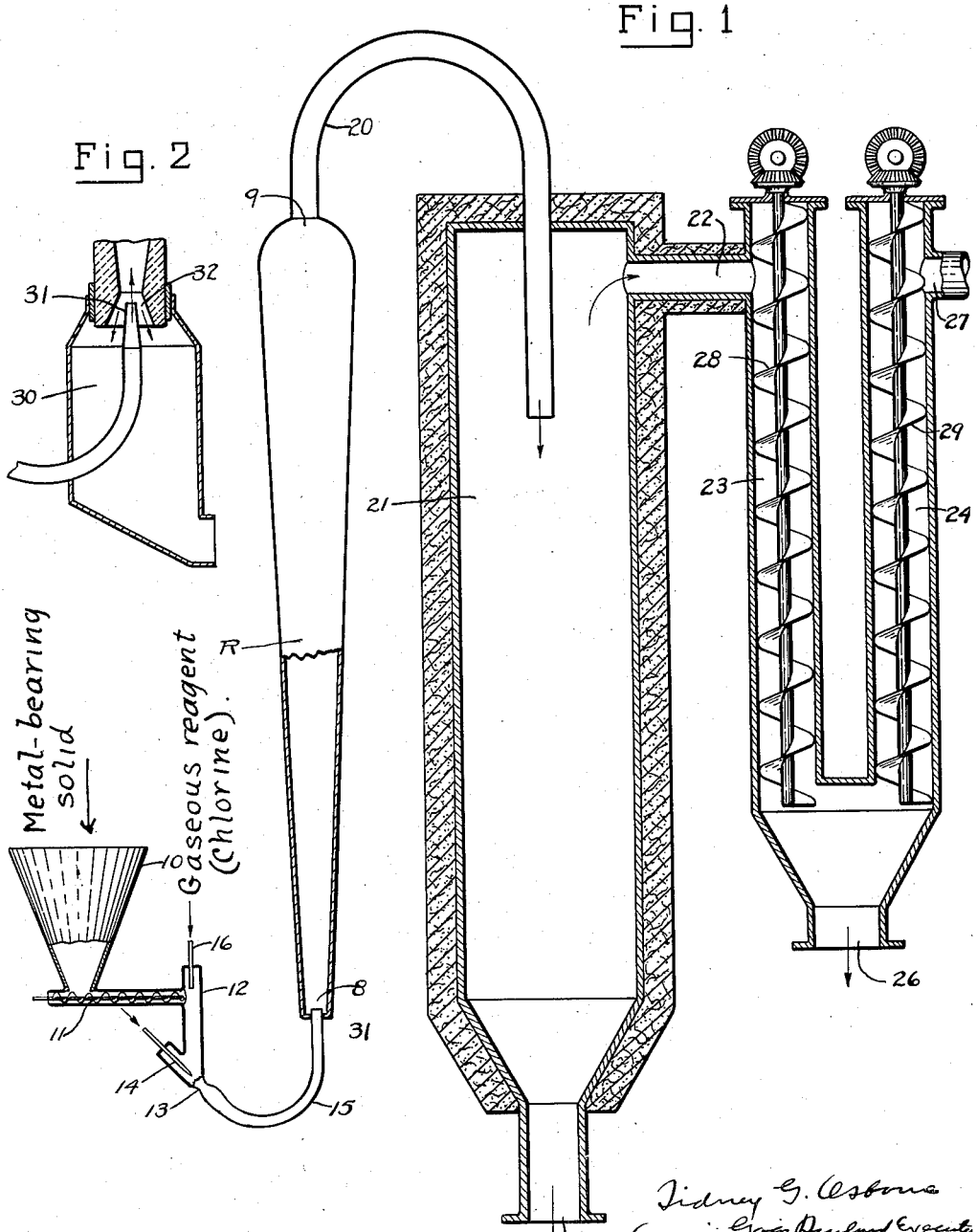

2,020,431

UNITED STATES PATENT OFFICE 2,020,431

PROCESS OF REACTING CHLORINE WITH METAL-BEARING SOLIDS

Sidney G. Osborne, New York, N. Y., and Jasper M. Rowland, deceased, late of Niagara Falls, N. Y., by Annie Gage Rowland, executrix, Niagara Falls, N. Y., assignors to Hooker Electrochemical Company, Niagara Falls, N. Y., a corporation of New York Application February 1, 1933, Serial No. 654,692

8 Claims. (Cl. 23—87)

This invention relates to a process and apparatus for reacting fluids with or in the presence of solids under controlled conditions, said solids being in a granular state and held in dynamic suspension by the upward velocity of said fluids.

The reaction may be between one or more fluids and one or more solids or between two or more fluids, the solids in that case serving as catalyst for promoting the reaction. A typical example of the first would be the reacting of gaseous chlorine with a metal or its ores or both, in granular form, with or without a reducing agent, such as carbon, to form the chloride of the metal. A typical example of the second would be the reacting of hydrogen with nitrogen in the presence of reduced iron and lamp black to form ammonia.

One object of the invention is to provide a process wherein a very thorough and intimate mixture of the gas and solid materials is attained without layering or channeling by suspending said materials in a gas stream of predetermined velocity to maintain and prolong the suspension until the reaction is complete. This is attained by opposing gravity to the direction of flow so that the upward velocity of said materials is less than that of the gas stream.

Another object of this invention is to avoid the necessity for finely pulverizing the solid materials which has heretofore been found essential.

Still another object of this invention is to maintain at all times an excess of the solid material without the danger of losing some of it out the exit. This is accomplished by regulating the velocity of the gas stream at the top of the reaction chamber so that it is insufficient to carry out the solid particles until they are reduced to impalpable ash. Thus if the reaction is exothermic the cross section will be greater than in proportion to the increase in temperature, in order to cause a reduction in velocity proportional to the change in size of the granules of solid material. Since in dynamic suspension the lift is a function of surface and the weight a function of volume, there will be a definite zone in which granules of a given size will float. As the reaction proceeds and the granules diminish in size, they will rise until finally they float off as ash. If the reaction is endothermic, the materials may be introduced hot and the cross section may be constant or even diminish in order to carry off the ash.

Another object of this invention is to control the temperature of reaction so as to avoid extreme violence and destructive effect upon the walls of the reaction chamber. This is accomplished by combining exothermic and endothermic reactions and by admixture of inert gases such as nitrogen or carbon dioxide.

A further object of this invention is the provision of a simplified feed mechanism remote from the reaction zone which can be regulated to prevent backfire and to assure neutral pressure at the point of introduction of the solids.

This invention is typically applicable to the production of aluminum chloride by burning aluminum containing material in a current of chlorine under conditions acting to cool the reacting materials so as properly to control the temperature of the reaction. In the process of this invention the aluminum material may be formed as a mixture including ingredients reacting to absorb heat in sufficient amount to dilute the exothermic reaction and control its temperature, the solid materials being in divided form and kept suspended in the burning gases which are readily cooled by contact with the walls of the reaction chamber.

Further objects of the invention particularly in the provision of apparatus for maintaining the particles of the material suspended in the reaction chamber will appear from the following description taken in connection with the accompanying drawing in which Fig. 1 is a diagram illustrating apparatus adapted to carry out the process, and Fig. 2 is a diagrammatic view of a detail shown on an enlarged scale.

In the system illustrated in the drawing the reaction chamber R is vertical with the entrance 8 at the lower end and the discharge 9 at the top. The chlorine gas and the material containing aluminum are fed in together and directed upward at 8 and burn with the evolution of heat forming aluminum chloride which passes out as a gas through the discharge 9. The chamber R has a large exposed radiating surface in proportion to its cubical contents, and it acts to dissipate and radiate the heat from the reaction.

The injected mixture of chlorine and aluminum bearing material may be provided in any desired manner. In the apparatus shown a hopper 10 contains a mixture of aluminum compounds such as alumina mixed with particles of aluminum, these materials being in divided form adapted to be fed in regulated amount through the screw conveyor 11 to the vertical tube 12, where they pass down to the venturi 13 into which is directed a jet of chlorine gas from the nozzle 14. The velocity of the chlorine in the neck of the venturi feeds in the granular material from the tube 12 distributing it to the chlorine stream and passing the mixture at high velocity through the tube 15 and upward at 8 into reaction chamber R. A primer or pilot flame or spark initiates the reaction which is thereafter self-supporting due to the heat evolved by the combining of the aluminum and chlorine. Such reaction would be too violent and the temperature undesirably high if pure chlorine and metallic aluminum were used alone. Therefore, to reduce and control the temperature in the reaction tube R aluminum oxide in any of its various forms is added mixed with carbon or other reducing agents, these mixtures with the metallic aluminum being introduced into the chlorine gas stream at the venturi 13. The carbon in granular form may be mixed with the aluminum and alumina in the hopper 10, or may be separately supplied by adjustable feed 16 leading into the top of tube 12. All of these materials are in cool condition until in the reaction chamber. The solid particles of alumina and carbon are kept in prolonged intimate relation at the elevated temperature of the reaction.

The bore of the reaction tube R increases in diameter at a rate tending to give a somewhat lower velocity toward the upper end. The higher velocity near the entrance end of the tube tends to carry the granular particles of solid matter upward toward the discharge, and the progressive reduction in velocity causes the larger particles to float in suspension so that only the lighter particles of ash and the like are carried out through the discharge 9. The larger particles remain oscillating within the tubular reaction chamber, rising as they are reduced in size until they are sufficiently light to be carried upward and out by the low velocity at the upper end of the tube. The treatment within the reaction tube R is therefore, self-adjusting, retaining the particles in suspended condition within the chlorine gas stream and progressively reducing them in size until they are in the form of light ash floating out with the aluminum chloride vapors.

The size of the largest particles as introduced into the reaction chamber may be coarse up to one quarter inch mesh or larger, depending upon the size of the apparatus used. These need not be carefully graded, however, but may be in a mixture of coarse and fine particles, such as would be produced by crushing, without subsequent screening or classifying. The products leaving the reaction tube are substantially aluminum chloride vapor, ash and such impurities as may be present in gaseous state. The gases leaving the reaction tube are conducted through the outlet tube 20 into a spacious chamber or series of chambers, indicated at 21 in the diagram, where due to the low velocity the ash settles out and the temperature of the gases is gradually reduced. The high condensing impurities which condense above aluminum chloride then also drop out. Before the condensing temperature of aluminum chloride is reached, the gas is passed through outlet 22 into a series of aluminum chloride condensers 23, 24 where a high yield of anhydrous aluminum chloride in crystal form is obtained, the final residual gases passing out through the exit opening 27, and these will contain some silicon chloride recoverable by lower temperature condensation if silicon bearing materials are present in the process.

The high condensing by-products or impurities may be withdrawn at 25 and the aluminum chloride at 26. The worms 28, 29 are provided for the purpose of scraping out the chambers 23, 24 and carrying the product down toward the discharge 26.

The amount of chlorine supplied at nozzle 14 will be closely adjusted to combine properly with the aluminum content of the material fed into the tube 12 and the carbon supplied at 16 will also be accurately proportioned to provide for the reduction of alumina or other material to give the desired endothermic effect in the reaction tube. This reduction of the oxide may be accomplished by the use of carbon in any convenient form, such as granulated coke, charcoal, graphite, powdered coal or the like, and it is preferable to have the reducing agent as free from hydrocarbons as practicable. The aluminum bearing material mixed with the particles of metallic aluminum may be any of the various low grade aluminum drosses of commerce or any other convenient source of alumina, or calcined bauxite, or other alumina clay may be used or aluminum carbide. Such material when mixed in granular form with carbon will be reduced in the reaction chamber to yield aluminum for combination with the chlorine, and the suspending reflux action in the reaction tube of this invention maintains the solid particles under the reacting conditions until these changes are completed and nothing but ash remains.

Usually the cooling action by radiation from the reaction tube and the endothermic effect of the reducing action within the tube will be sufficient to retain the temperature below 1800 degrees F. Other means of reducing the temperature in the reaction tube may also be resorted to, for instance the introduction of an inert gas such as carbon dioxide to dilute the chlorine supplied through nozzle 14, this is likely to be wasteful, and it is preferable to control the temperature by the use of a sufficient quantity of endothermic material in the hopper 10. The reducing action itself supplies aluminum for the chlorine reaction when the aluminum bearing compound is used as the endothermic material so that substantially all of the aluminum available is converted into aluminum chloride with very little waste.

The reaction chamber R may be tapered continuously along straight lines as indicated in the diagram, or the side surfaces may be curved in section to produce any desired variation in the velocity of the passing gases, or the successive portions of the reaction tube may be cylinders of larger diameter for each upward step. The important object is to render the reaction automatic in its suspension and retention of the solid particles until they have been consumed or reduced to light flakes containing little or none of the substances used in the reaction. In the event that any of the particles are so large or are fused together to become so large as to drop below the influence of the upward flowing gases, these particles will pass downward to the bottom of the reaction chamber R and means may be provided as diagrammed in Fig. 2 to form a sump or receptacle 30 for such particles permitting them to accumulate for removal at convenient intervals. The nozzle 31 at the entrance to the reaction chamber is surrounded by a space 32 forming a discharge into the chamber 30.

While this process has been described in connection with the production of chlorides such as those of aluminum and silicon, it is applicable to other solids and to other gases. Any combining action between gases and solid granules may be carried out in similar manner and with the mixture of materials giving exothermic or endothermic reactions or both simultaneously to enable the temperature to be regulated and kept within predetermined limits. In some cases it may be necessary to supply heat to the reaction when it is endothermic, or to maintain the temperature sufficiently high for the desired combining of the ingredients. Iron in divided form may be used instead of aluminum to give ferric chloride, or anhydrous hydrogen chloride may be used with aluminum instead of chlorine to give aluminum chloride. Gaseous sulphur chloride may be combined with chlorine so as to use the sulphur as a reducing agent by formation of $SO_2$ and acting as a substitute for carbon in reducing alumina for instance in the production of aluminum chloride. Two gases such as nitrogen and hydrogen may be combined to form ammonia in the presence of solid particles forming a catalyzer kept in suspension in the reaction chamber.

What is claimed is:

1. The process of reacting chlorine with metal-bearing solids which will react exothermically therewith with substantially complete vaporization of the products of reaction which process comprises introducing the relatively coarsely comminuted ungraded solids into a stream of gas containing chlorine flowing upwardly in a reaction chamber of gradually increasing and abruptly decreasing cross-sectional area, and adjusting the rate of admission of solids and gases to the capacity of said reaction chamber and to the increase in volume of said gases to cause a progressive reduction in velocity and to maintain at substantially the point of greatest cross section of said reaction chamber a zone in which the velocity is sufficient to support the solids only after they have been reduced in size to relatively fine particles consisting principally of materials unreactable with the chlorine.

2. The process of reacting chlorine with metal-bearing solids having a highly exothermic reaction therewith which process comprises introducing the relatively coarsely comminuted ungraded solids into a stream of gas containing chlorine, directing said stream centrally upward in an unobstructed reaction chamber of gradually increasing and abruptly decreasing cross-sectional area and regulating the rate of admission of the solids and gases to cause a temperature of reaction sufficiently elevated to vaporize substantially all the products of reaction and to maintain at the point of greatest cross-section of said reaction chamber a zone in which the velocity is sufficient to sustain the solids only after they have been reduced in size by the reaction to relatively fine particles consisting principally of material unreactable with the chlorine.

3. The process of reacting chlorine with metal-bearing solids which will react exothermically therewith with vaporization of substantially all the products of reaction which process comprises introducing the relatively coarsely comminuted ungraded solids into a stream of gas containing chlorine directing said stream centrally upward in an unobstructed reaction chamber of gradually increasing and abruptly decreasing cross-sectional area, and adjusting the rate of admission of solids and gases to the capacity of said reaction chamber and to the increase in volume of said gases to cause a progressive reduction in velocity and to maintain at the point of greatest cross-section of said reaction chamber a zone in which the velocity is sufficient to support the solids only after they have been reduced in size by the reaction to relatively fine particles consisting principally of material unreactable with the chlorine.

4. The process of reacting chlorine with metal-bearing solids which react exothermically therewith, with relatively great increase in temperature and substantially complete vaporization of the products of reaction, which process comprises introducing the unpreheated solids into a stream of unpreheated gas containing chlorine, said solids being in relatively coarse, non-uniform sizes, such as would be produced by crushing without classifying; directing said stream centrally upward in a vertical reaction chamber of unobstructed cross-section and gradually increasing and abruptly decreasing cross-sectional area; supplying heat to said reaction chamber to initiate the reaction and thereafter retaining sufficient of the heat of reaction therein to continue the reaction while dissipating the excess heat; and regulating the admission of gas and solids to the capacity of said reaction chamber and to the increase in volume of said gas, due to increase in temperature and accession of vaporized products, to cause a progressive reduction in velocity within said reaction chamber and to establish and maintain at substantially the point of greatest cross-section of said reaction chamber a zone at which the velocity is insufficient to support any considerable proportion of the original solids until their size has been reduced by attrition due to the reaction to relatively small particles of a degree of fineness denoting substantial completion of the desired reaction; whereby the solids are supported by a single jet constituted by the original stream, augmented only by the vaporized products, and caused to classify themselves at different levels in said reaction chamber in accordance with size and to there oscillate for a sufficient time to permit them to reach reacting temperature and then to rise freely and unobstructedly as and when their size has been reduced by progress of the reaction and to be carried out at the top of said reaction chamber, together with the residual gases and vaporized products, when and not before they have been reduced to said degree of fineness.

5. The process as defined in claim 1 in which the metal-bearing solids contain a metal mixed with its oxide and a reducing material in the proportions to produce a self-supporting reaction without destructive temperatures.

6. The process as defined in claim 1 in which the metal consists largely of aluminum.

7. The process as defined in claim 1 in which the metal consists largely of iron.

8. The process as defined in claim 1 in which the gases contain sulphur chloride.

SIDNEY G. OSBORNE.
ANNIE GAGE ROWLAND,
*Executrix of the Last Will and Testament of Jasper M. Rowland, Deceased.*